Patented Sept. 13, 1938

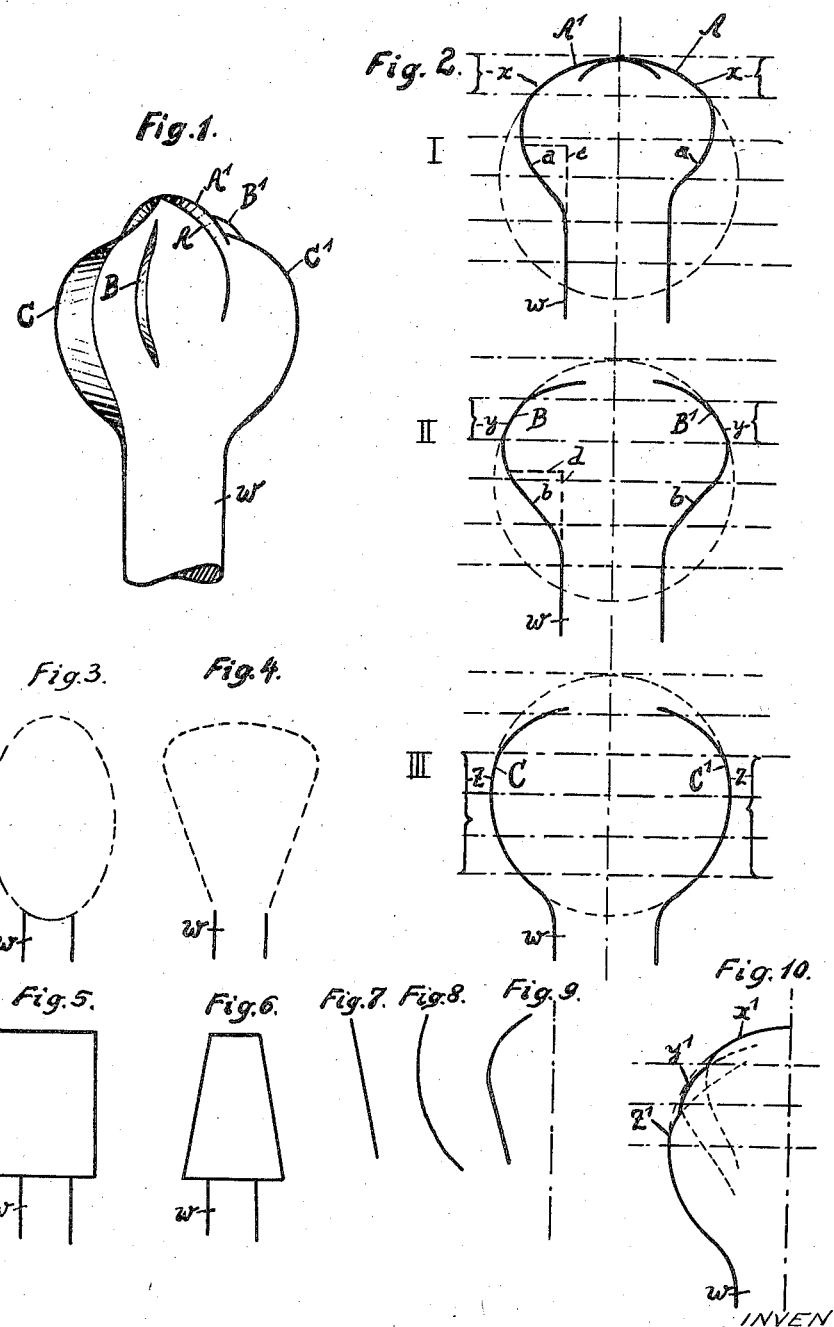

2,129,843

UNITED STATES PATENT OFFICE 2,129,843

DENTAL OR LIKE DRILL

Heinz Hollmann, Dortmund, Germany

Application July 17, 1935, Serial No. 31,763
In Germany July 26, 1934

4 Claims. (Cl. 32—48)

This invention relates to an improved dentists' or like drill which differs from known dentists' drills both as regards its construction and the result obtained, inasmuch as it is possible with it to bore with the lightest possible pressure although with the maximum effect, whilst at the same time shocks are entirely eliminated and, further, the grindings or borings are more effectively removed.

In the dentists' or like drill according to the invention, the boring head is provided between the shank and the point with graded cutters, which are straight or curved as desired, parallel or arranged in staggered relation. These graded cutters are separate from one another. The transition from one cutter to the other is smooth, or the side surfaces on the cutting parts curved prematurely towards the shank. The individual cutters viewed in profile may themselves be straight, curved or wavy, but are preferably of arcuate sickle shape, in which case the action of the drill on the material which is being bored proceeds very gradually so that the drill operates in a very favourable manner. The cutters are made scoop shaped in cross section and operate with a scooping action.

The distances between the individual drill cutters from one another in their graded relation one following the other, and in regard to the axis of the drill may vary. In the case of a spherical headed drill the leading cutter may be at the least distance from the axis of the drill whilst the final cutter may be at the greatest distance from said axis.

The drill according to the invention differs from known drills in that in the known drills the plurality of cutters made of the same length, and in planes equidistant from the axis of the drill confers on the drill the nature of a milling cutter, which necessitates an increased pressure to effect proper performance of its work. This increased pressure results moreover, in the production of greater heat, whereby a gradually increasing sensation of pain results. With such a drill if a cutter lying in a plane passing through the axis is allowed to project a trifle beyond the spherical outline a slight improvement at first results. But as soon as the slightly projecting cutter has worked into the material being treated, all the other cutters come into action at the same time, so that the same disadvantage again arises.

The double cutter known as such has on the other hand the disadvantage of unreliable working and causing shocks, in addition to not being free from objection as regards the removal of borings, which defect is moreover characteristic of all known drills and in particular results in undue heating of the drill by the work, which causes considerable pain to the patient, as well as leading very quickly to destruction of the drill.

In the drawing:—

Figure 1 is a perspective of a drill constructed in accordance with the principles of the present invention;

Figure 2 illustrates diagrammatically three sections of the drill shown in Figure 1 taken in three different planes;

Figures 3, 4, 5 and 6 show four different forms of the drill;

Figures 7 to 10 are diagrams illustrating different arrangements of the cutting portions of the drill.

All these disadvantages are avoided by the drill according to the invention. It possesses the advantageous feature of the so-called double cutter but avoids its serious disadvantages, such as shocks, inefficient removal of borings, and unreliability of action.

By spacing the cutters around the circumference of a drill, in accordance with the invention, and grading them successively, in other words, by providing the drill head between the shank and the point with graded cutters which are straight, or curved if desired, parallel, or arranged in staggered relation, not only may increased space be obtained for the removal of the borings, but at the same time it is ensured that the drill operates reliably and does not cause shocks. With quite light pressure it is possible to obtain an excellent, rapid and in all respects satisfactory boring operation.

Several constructional forms of the invention are shown by way of example in the attached drawing, and these may be modified in many different ways, without departing from the scope of the invention.

The invention is shown in Figures 1 and 2 applied to a drill whose general outline is spherical. Whilst Figure 1 is a side view in elevation with the widest cutting parts CC' in profile, Figure 2 consists of three diagrammatic sections I, II, and III, in planes which pass through the individual cutting parts AA' and BB' and CC' (Figure 1) of the several cutters.

Of the cutters AA' the part indicated by $x$ in Figure 2, I, is the cutting part, of the cutters BB' the part indicated by $y$ in Figure 2, II, and of the cutters CC' the part indicated by $z$. If the several diagrams I, II, and III of Figure 2 were superposed one upon the other, then the cutting parts x, y and z would give a cutter of circular shape, which is no longer divided into graded cutters, following one behind the other, in accordance with the invention, and giving the advantages hereinbefore set forth.

The parts a and b of the cutters AA' or BB' which do not come into question for cutting, may, as shown, merge into the material of the drill shank. Preferably, however, they are sharply offset from the main part of the drill shank, as is indicated by c and d. By this means greater space is obtained for the removal of the borings. The rearmost cutter parts CC' are on the contrary extended up to the drill shank, so that it will remain possible by means of these to cut close up to the drill shank w.

Whilst in Figures 1 and 2 the drill is of spherical shape, in Figures 3 to 6 are shown examples of other shapes, namely egg shaped, pear shaped, cylindrical, and cone shaped, to which the invention is applicable with the same advantages.

The individual cutting parts x, y and z of the cutters AA', BB', and CC' viewed in profile, may lie in a flat plane (Figure 7), or be curved (Figure 8), or of sickle form (Figure 9), or may have a scoop form.

Whilst the individual graded and successive cutting parts x, y and z according to Figure 2 merge smoothly into one another, according to Figure 10 the transition is so contrived that symmetrical corners are formed between the cutting parts x', y' and y', z', so that ledges are formed in the material being bored. These ledges not only provide larger and advantageous holding surfaces for the material or filling inserted into the bore but also produce at the same time shoulders for resisting pressure, which is entirely novel in the preparation of cavities and is impossible to achieve with known drills and milling cutters.

What I claim is:—

1. A dental drill comprising a drill head and a shaft, a plurality of spaced cutting members extending radially from said drill head, the cutting edges of said cutting members being successively offset in a longitudinal direction relative to one another, pairs of successive cutting edges being spaced at different distances from the axis of said drill head whereby said cutting members will operate collectively as a two-edged drill performing a single cutting operation.

2. A dental drill according to claim 1 in which said cutting members extend in a curvature over the periphery of said drill head.

3. A dental drill according to claim 1 in which said cutting members are curved about the periphery of said drill head, the curvature of the individual cutting members increasing progressively towards the shaft whereby ledges are formed in the material to be drilled forming shoulders for resisting the pressure and whereby an increased retaining surface for the filling material is produced.

4. A dental drill according to claim 1 in which the non-cutting portion of the cutting members are sharply offset from the main part of the shaft whereby an increased base is obtained for the removal of the borings.

HEINZ HOLLMANN.